United States Patent [19]

Shinoda

[11] Patent Number: 4,779,036
[45] Date of Patent: Oct. 18, 1988

[54] AC POWER CONTROL APPARATUS
[75] Inventor: Takahisa Shinoda, Shizuoka, Japan
[73] Assignee: Koito Manufacturing Co., Ltd., Tokyo, Japan
[21] Appl. No.: 58,941
[22] Filed: Jun. 5, 1987
[30] Foreign Application Priority Data
  Jun. 6, 1986 [JP] Japan ................. 61-130265
[51] Int. Cl.$^4$ ............................. G05F 1/40
[52] U.S. Cl. .................. 323/236; 323/268; 307/81
[58] Field of Search ......... 323/235, 236, 268, 901, 323/907; 363/49; 307/80, 81

[56] References Cited
U.S. PATENT DOCUMENTS

| | | | |
|---|---|---|---|
| 3,959,714 | 5/1976 | Minelich | 323/901 X |
| 4,384,213 | 5/1983 | Bogel | 307/80 X |
| 4,434,358 | 2/1984 | Apfelbeck et al. | 323/235 X |
| 4,493,984 | 1/1985 | Yamauchi | 323/236 X |
| 4,589,059 | 5/1986 | Tanino | 323/901 X |

Primary Examiner—Patrick R. Salce
Assistant Examiner—Kristine Peckman
Attorney, Agent, or Firm—Blakely, Sokoloff, Taylor & Zafman

[57] ABSTRACT

An AC power control apparatus includes a plurality of power supply circuits for generating powers having different maximum values, a switching circuit for, after an AC current is continuously set in a desired turn on control state, alternately selecting a first power supply circuit used until that time and a second power supply circuit for supplying a power approximating a power supplied to a load at that time from the plurality of power supply circuits, a turn on time control circuit for gradually shortening a turn on time of the first power supply circuit while gradually prolonging a turn on time of the second power supply circuit until the turn on time of the second power supply circuit corresponds to the entire period, and a circuit for changing the turn on time of the power supply circuit in units of periods of the AC current.

4 Claims, 11 Drawing Sheets

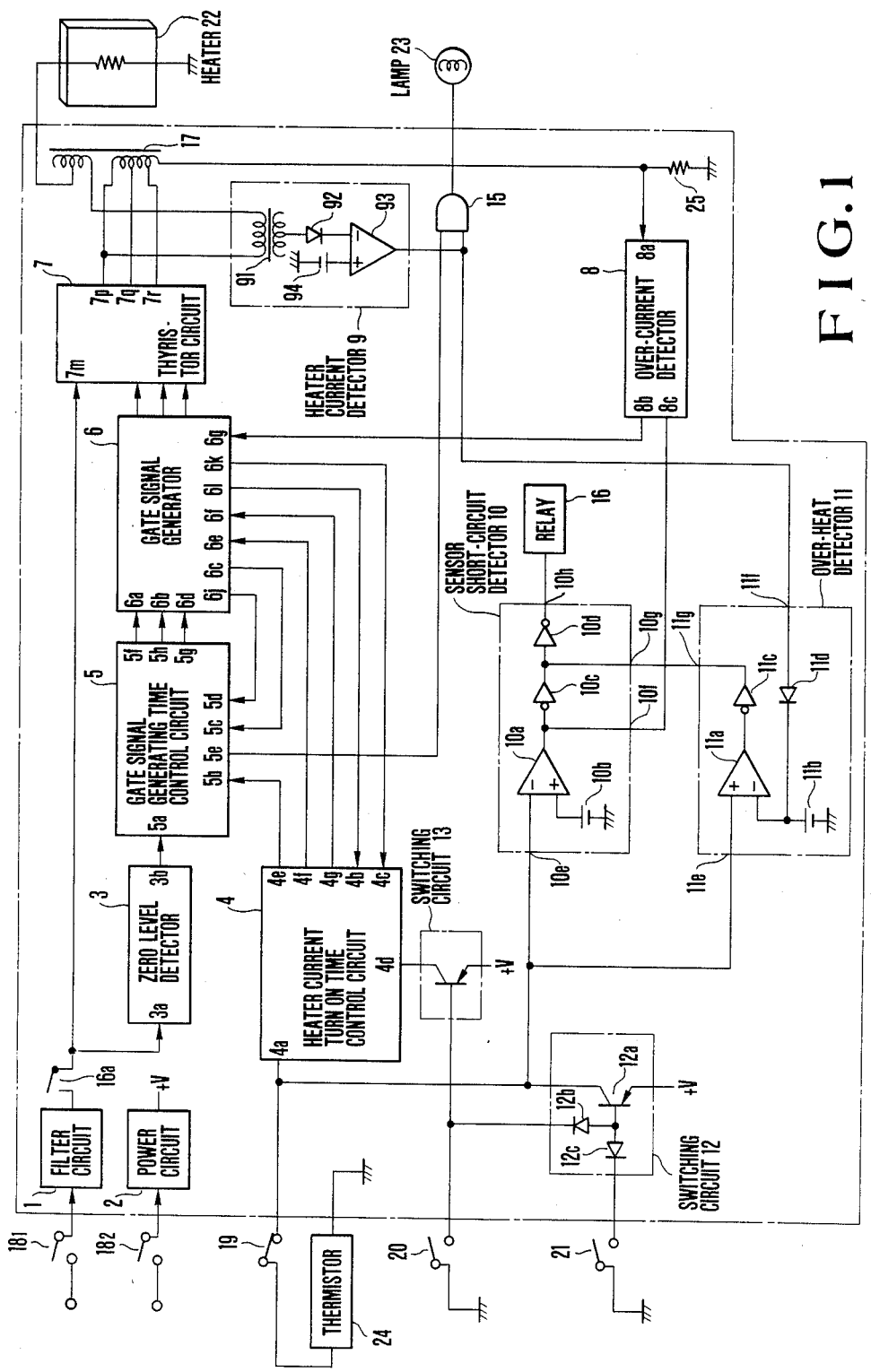
F I G. 1

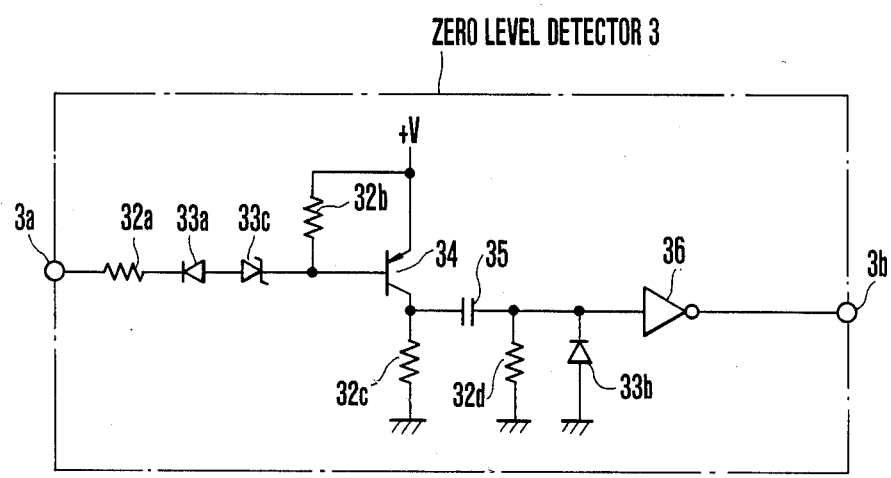
F I G. 2

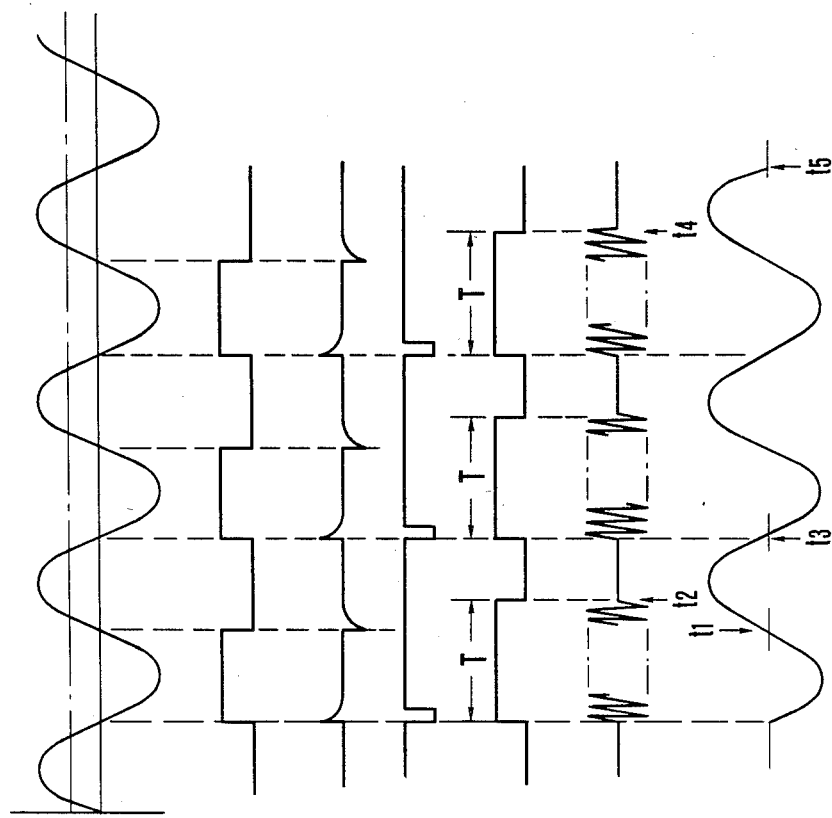

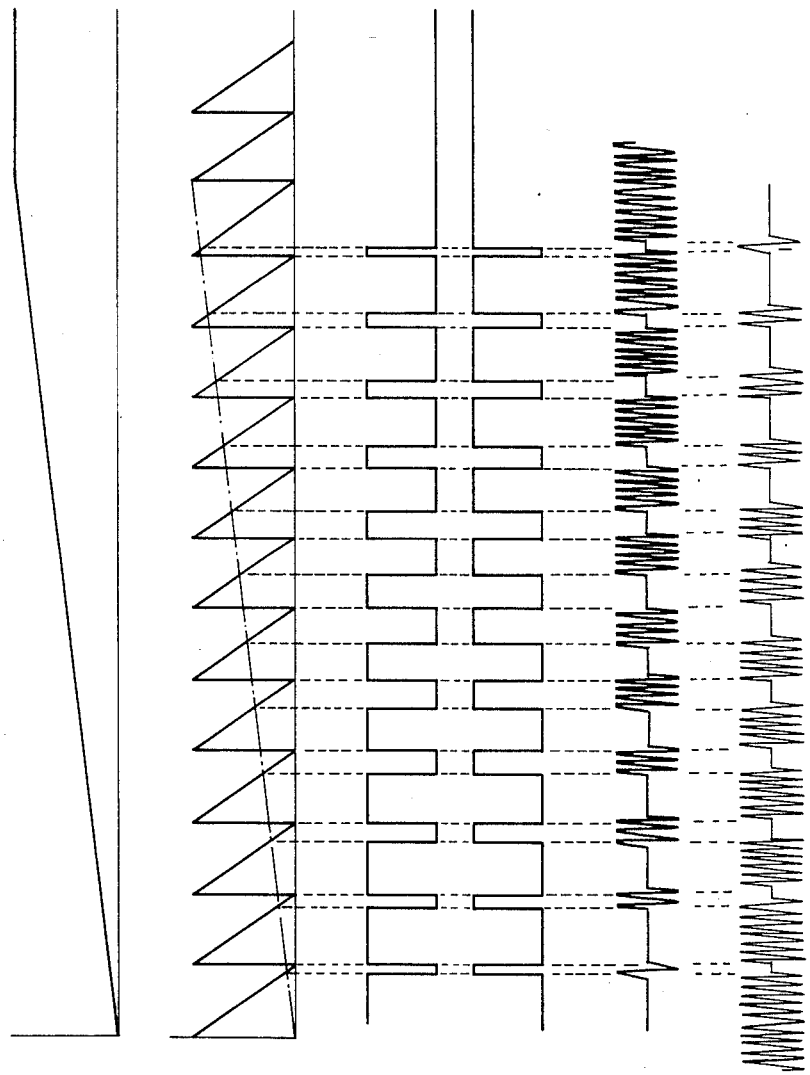

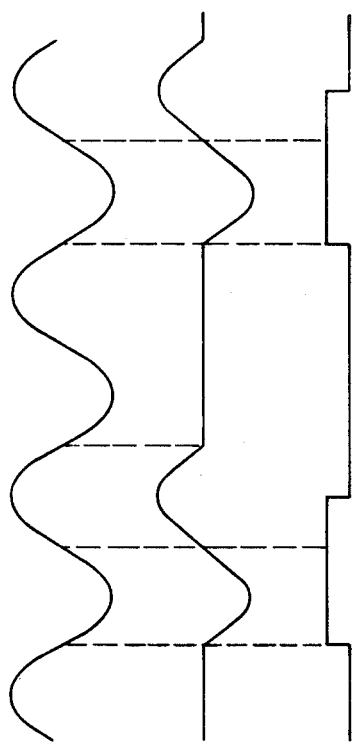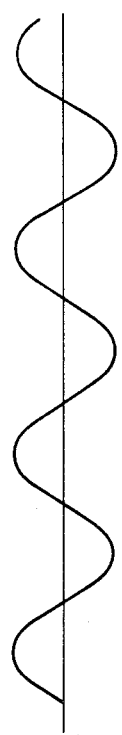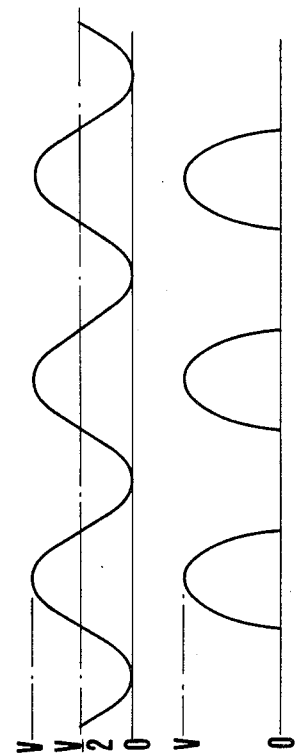

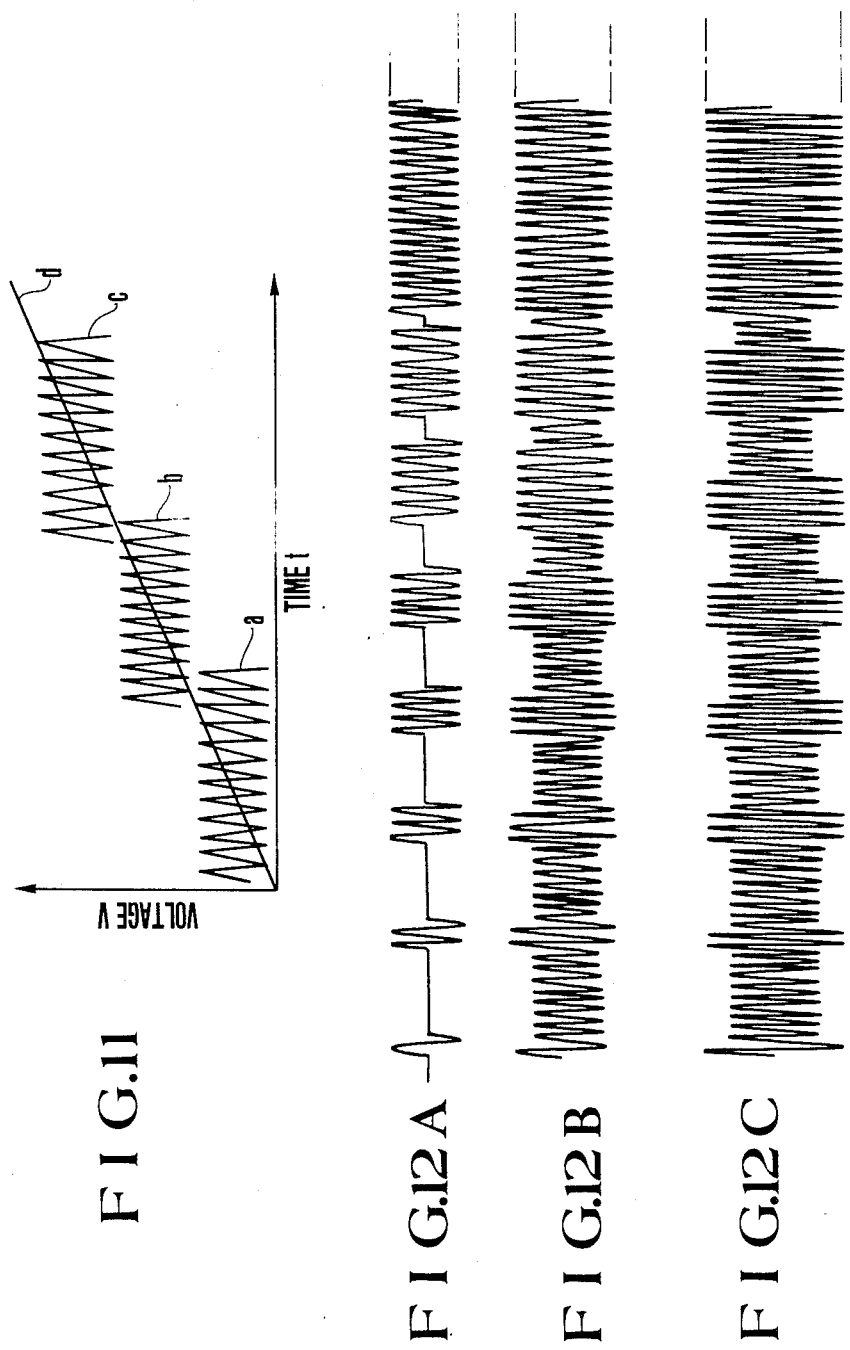

AC POWER CONTROL APPARATUS

BACKGROUND OF THE INVENTION

The present invention relates to an AC power control apparatus and, more particularly, to an AC power control apparatus for controlling a turn on time or energization time of a power supply AC current supplied to a load.

In general, a heater is embedded in a windshield glass provided to a cockpit of an airplane, and a current is supplied to the heater to heat the glass so as to prevent fogging and icing. The current is supplied from an AC power supply installed in the airplane, and its value must be adjusted in accordance with an atmospheric temperature. Conventionally, the current is phase-controlled using a thyristor.

A conventional control apparatus which performs phase control using a thyristor has the following drawbacks. More specifically, an AC waveform becomes discontinuous, and causes noise. In order to prevent generation of noise, it can be considered that a current is controlled in accordance with a turn on time in units of periods of an AC current.

However, a generator installed in the airplane does not have a very good voltage fluctuation factor. Therefore, if a current is controlled in accordance with a turn on time in units of periods of an AC current, fluctuation in generator output voltage is increased, and causes fluorescent lamps for illumination to flicker.

In order to prevent discontinuity of a current, it can be considered that a plurality of power supply circuits having different powers are selectively used. In this case, when the current supply circuits having different powers are switched, a large current is instantaneously supplied due to phase mismatching of a voltage current upon switching, and a power supply voltage fluctuation may occur.

In the conventional current control circuit using the thyristor, the thyristor requires a very strict gate signal condition for turning on, and a gate signal circuit becomes complicated, resulting in high cost.

SUMMARY OF THE INVENTION

It is an object of the present invention to provide a system for supplying an AC power to a load while switching a plurality of power supply circuits and for controlling a current in accordance with a turn on time in units of periods of the AC current and to provide an inexpensive AC power control apparatus having a simple circuit arrangement in which voltage fluctuation caused by discontinuity of a current upon switching of the power supply circuits can be eliminated, a turn on operation of a thyristor can be reliably performed, and hence, an adverse influence such as noise to other equipment can be eliminated.

In order to achieve the above object of the present invention, there is provided an AC power control apparatus comprising a plurality of power supply means for generating powers having different maximum values, switching means for, after an AC current is continuously set in a desired turn on control state, alternately selecting first power supply means used until that time and second power supply means for supplying a power approximating a power supplied to a load at that time from the plurality of power supply means, turn on time control means for gradually shortening a turn on time of the first power supply means while gradually prolonging a turn on time of the second power supply means until the turn on time of the second power supply means corresponds to the entire period, and means for changing the turn on time of the power supply meansiin units of periods of the AC current.

BRIEF DESCRIPTION OF THE DRAWINGS

FIG. 1 is a block diagram showing an embodiment of the present invention;

FIG. 2 is a detailed circuit diagram showing a zero level detector shown in FIG. 1;

FIGS. 8A to 8G are timing charts of signals for explaining the operation of the circuit shown in FIG. 1;

FIGS. 9A to 9F are timing charts of signals for explaining the operation of the circuit shown in FIG. 1;

FIGS. 10A to 10C are waveform charts showing a turn on state of a thyristor;

FIG. 11 is a graph showing a generating state of a comparison signal in accordance with a temperature of a control object;

FIGS. 12A to 12C are graphs showing waveforms of supplied to a heater; and

FIGS. 13A to 13C are timing charts for explaining the operation of the over-current detector.

DETAILED DESCRIPTION OF THE PREFERRED EMBODIMENT

Figure 3:
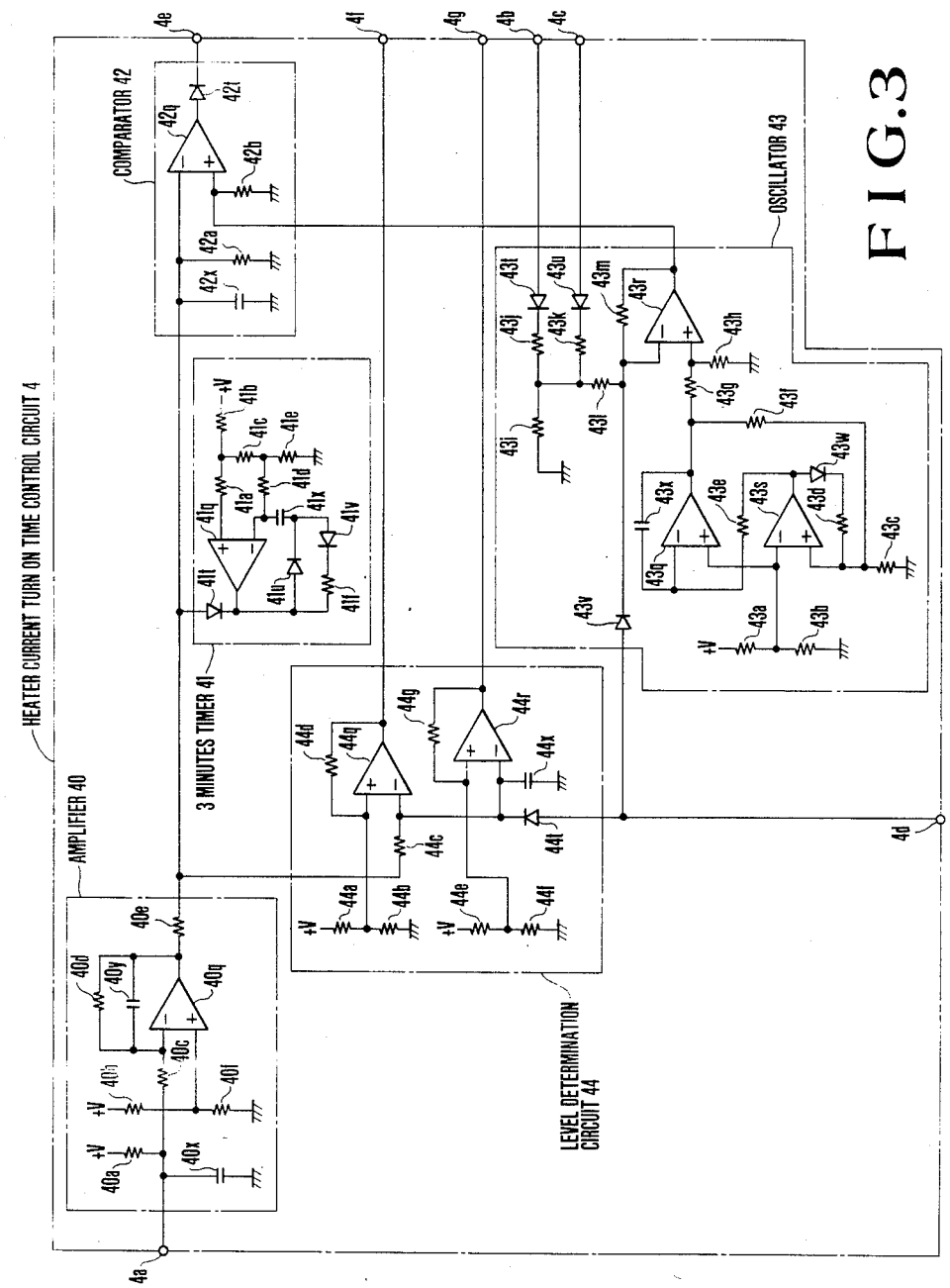
FIG. 3 is a detailed circuit diagram of a heater current turn on time control circuit shown in FIG. 1.

FIG. 1 is a block diagram showing an AC power control apparatus according to an embodiment of the present invention. In FIG. 1, reference numeral 1 denotes a filter circuit; 2, a power circuit; 3, a zero level detector; 4, a heater current turn on time control circuit; 5, a gate signal generating time control circuit; 6, a gate signal generator; 7, a thyristor circuit; 8, an over-current detector; 9, a heater current detector; 10, a sensor short-circuit detector; 11, an over-heat detector; 12 and 13, switching circuits; 15, an AND gate; 16, a relay; 16a, a contact of the relay 16; 17, a transformer; $18_1$ and $18_2$, interlocked power switches; 19, a sensor check switch; 20, an over-heat check switch; 21, a power-on check switch; 22, a heater embedded in a windshield of an airplane; 23, an operation indication lamp; 24, a thermistor for detecting a temperature of the windshield; and 25, a resistor.

The filter circuit 1 prevents entrance of external noise and noise leakage from this apparatus to an external apparatus. The power circuit 2 converts an AC voltage into a DC voltage necessary for the operation of this apparatus. The zero level detector 3 detects a zero level for each period of the AC waveform, and generates a pulse signal at the beginning of each period. As shown in FIG. 2, the zero level detector 3 comprises an input terminal 3a an output terminal 3b resistors 32a to 32d, diodes 33a to 33c, a transistor 34, a capacitor 35, and an inverter 36.

The heater current turn on time control circuit 4 controls the current supplied to the heater in accordance with a turn on time in units of periods of the AC waveform in accordance with the temperature of the windshield and a lapse time from power-on. As shown in FIG. 3, this circuit is constituted by an amplifier 40, a 3-minutes timer whose output voltage is linearly increased within about 3 minutes from power-on, a comparator 42, an oscillator 43 for generating a triangular wave at a frequency of about 8 Hz, and a level discrimination circuit 44. These circuit components are constituted by resistors 40a to 40f, 41a to 41f, 42a, 42b, 43a to 43m, and 44a to 44g, differential amplifiers 40q, 41q, 42q, 43q to 43s, 44a, and 44r, diodes 41t to 41v, 42t, 43t to 43w, and 44t, capacitors 40x, 40y, and 44x, input terminals 4a to 4c, and output terminals 4d to 4f.

Figure 4:
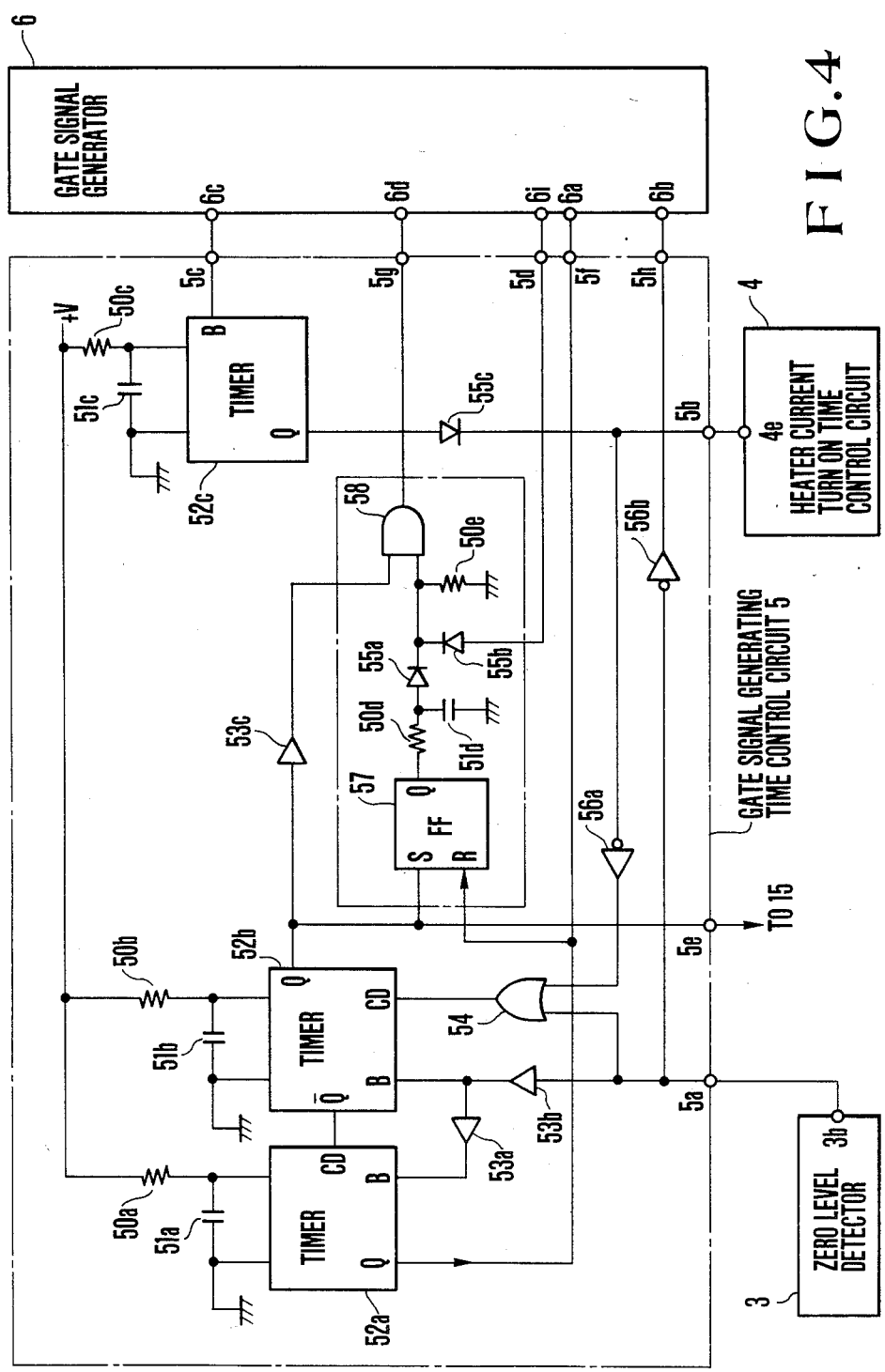
FIG. 4 a detailed circuit diagram of a gate signal generating time control circuit shown in FIG. 1.

The gate signal generating time control circuit 5 generates a gate signal necessary for controlling a turn on time for one period of the thyristor circuit 7. As shown in FIG. 4, the circuit 5 comprises resistors 50a to 50e, capacitors 51a to 51d, timers 52a to 52c, buffers 53a to 53c, an OR gate 54, diodes 55a to 55c, inverters 56a and 56b, RS flip-flop 57, an AND gate 58, input terminals 5a to 5d, and output terminals 5e to 5h.

Figure 5:
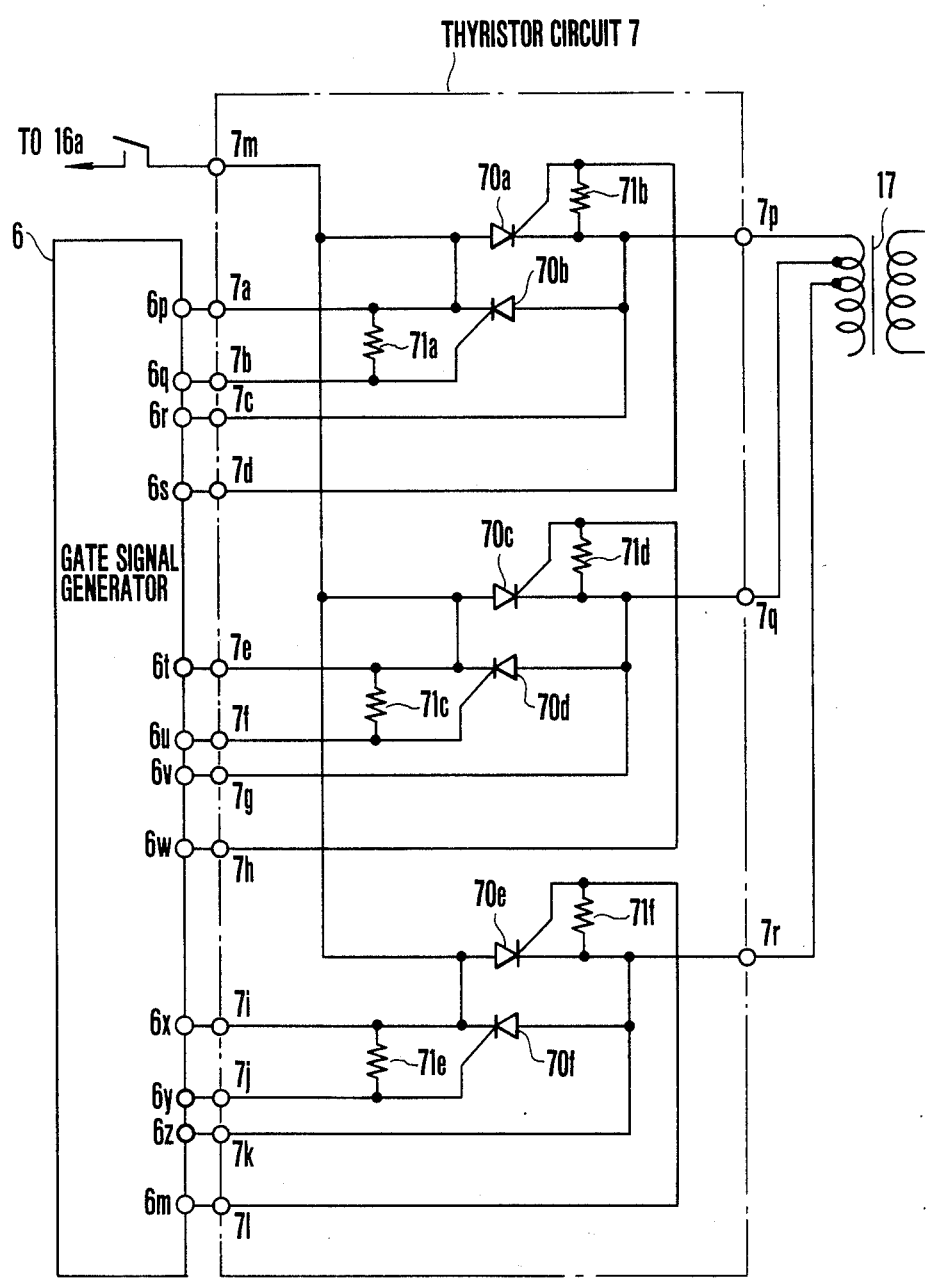
FIG. 5 is a detailed circuit diagram of a thyristor circuit shown in FIG. 1.

As shown in FIG. 5, the thyristor circuit 7 comprises thyristors 70a to 70f, input terminals 7a to 7m, and output terminals 7p to 7r.

Figure 6:
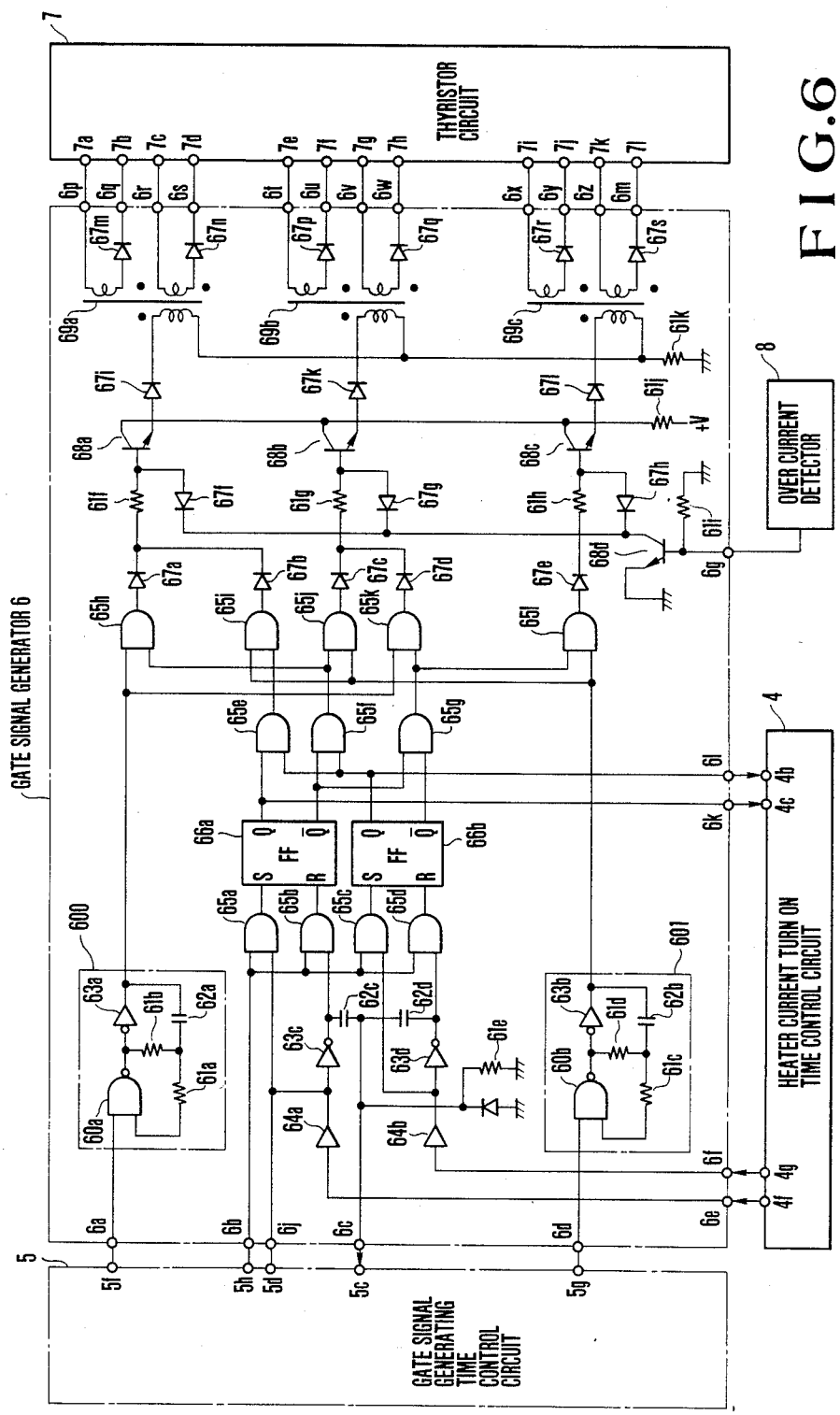
FIG. 6 is a detailed circuit diagram of a gate signal generator shown in FIG. 1.

As shown in FIG. 6, the gate signal generator 6 comprises NAND gates 60a and 60b, resistors 61a to 61h, capacitors 62a to 62d, inverters 63a to 63d, buffers 64a and 64b, AND gates 65a to 65l, RS flip-flops 66a and 66b, diodes 67a to 67d, transistors 68a to 68d, pulse transformers 69a to 69c, input terminals 6a to 6g, and output terminals 6j to 6m and 6p to 6z.

Figure 7:
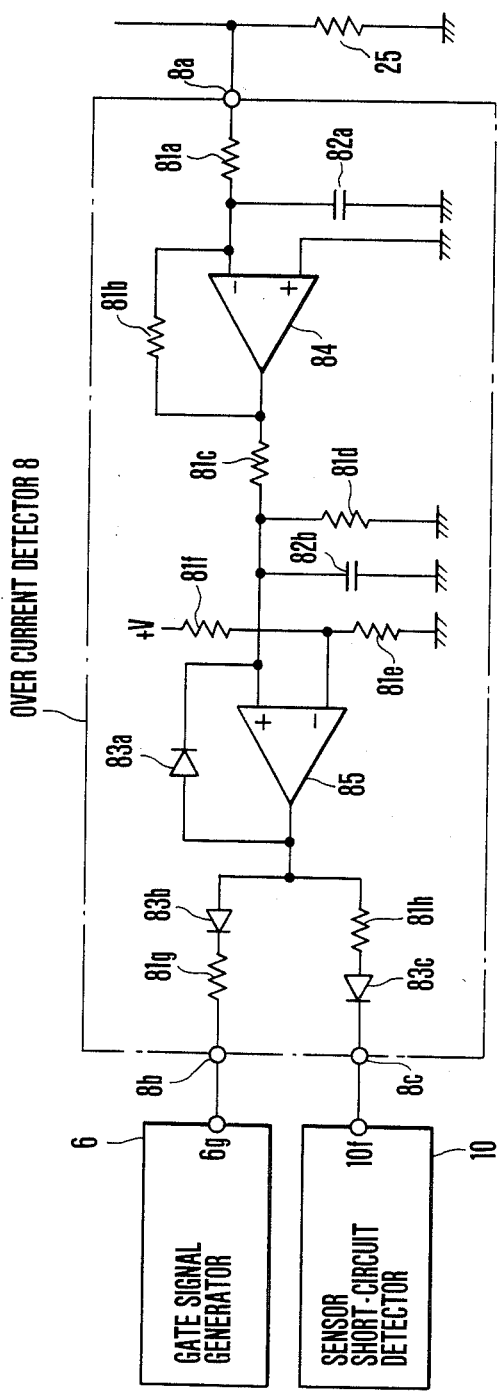
FIG. 7 is a detailed circuit diagram of an over-current detector shown in FIG. 1.

As shown in FIG. 7, over-current detector 8 comprises resistors 81a to 81h, capacitors 82a and 82b, diodes 83a to 83c, differential amplifiers 84 and 85, an input terminal 8a, and output terminals 8b and 8c.

As shown in FIG. 1, the heater current detector 9 comprises a transformer 91, a diode 92, a differential amplifier 93, and a reference voltage source 94. The detector 9 sends out a high-level (to be referred to as "1" hereinafter) signal when the rectification current generated by the heater current exceeds the value provided by the reference voltage source 94. The output from the reference voltage source 94 is selected to be slightly larger than the rectification current generated by a maximum rated value of the heater current supplied to the heater 22. Therefore, presence of the heater current causes heater current detector to continuously output the "1" signal.

The sensor short-circuit detector 10 comprises a differential amplifier 10a, a reference voltage source 10b, and inverters 10c and 10d. The detector 10 normally energizes the relay 16. When a sensor short-circuit state occurs, i.e., when a voltage supplied to the input terminal 10e becomes lower than the output from the reference voltage source 10b, or when an over-current detection state occurs, i.e., when the "1" signal is supplied to the input terminal, or when an over-heat detection state occurs, i.e., when a low-level (to be referred to as simply as "0" hereinafter) signal is supplied to the input terminal 10f, the relay 16 is deenergized.

The over-heat detector 11 comprises a differential amplifier 11a a reference voltage source 11b, an inverter 11c, and a diode 11d. When the over-heat detection state occurs, i.e., when a voltage higher than the output from the reference voltage source 11 is supplied to the input terminal 11e, the detector 11 sends out a "0" signal from the output terminal 11g. The switching circuit 12 consists of a transistor 12a and diodes 12b and 12c.

The operation of the AC power control circuit shown in FIG. 1 will now be described in detail with reference to FIGS. 8A to 8G, FIGS. 9A to 9F, FIGS. 10A to 10C, FIG. 11, FIGS. 12A to 12C, and FIGS. 13A to 13C.

For the sake of easy understanding, the following description is made under the assumption that only one type of power is supplied to the heater 22. Referring to FIG. 1, when the power switches $18_1$ and $18_2$ are turned on, the power circuit 2 supplies a voltage $+V$ necessary for the operation to the respective circuits. In a normal state, the relay 16 is energized and the contact 16a is closed. Therefore, an AC current shown in FIG. 8A input from an input terminal IN passes through the filter circuit 1, and is supplied to the input terminal 3a of the zero level detector 3. As shown in FIG. 2, in the zero level detector 3, a Zener diode 33c is inserted in series with the base circuit of the transistor, and the DC voltage $+V$ is applied to the transistor 34. Therefore, if the Zener diode 33c is short-circuited, since the transistor 34 receives the DC voltage $+V$, its operation start level corresponds to $+V$ as shown in FIG. 8A. When a value of the AC waveform is decreased to be smaller than the value $+V$, the transistor 34 is turned on. If the breakdown voltage of the Zener diode 33c is equal to the DC voltage $+V$ applied to the transistor 34, the transistor 34 is turned on when the level of the AC waveform is decreased from the operation start level $+V$ by V, and outputs a signal shown in FIG. 8B. More specifically, the transistor 34 is turned on in response to the zero level of the AC waveform, and is turned off in response to the next zero level.

In the above description, the reverse voltage across the base and emitter of the transistor 34 is zero. However, this value is about 0.7 V in practice, and this level cannot be ignored as an inherent operation start level of the transistor 34. However, when the DC voltage and the breakdown voltage of the Zener diode 33c are appropriately selected, the operation start level of the entire circuit can be adjusted to be "zero" level.

More specifically, the level-shift Zener diode 33c is inserted to cancel a DC bias voltage which is applied to the transistor 34 in the operation direction so that the operation start level of the transistor 34 corresponds to the zero voltage, thereby allowing zero level detection. A voltage generated across the resistor 32c as shown in FIG. 8B is differentiated by the capacitor 35 and the resistor 32d and converted to a signal shown in FIG. 8C. The signal is clamped by the diode 33b, and is inverted by the inverter 36. Then, the inverted signal is output from the output terminal 3b as a pulse signal shown in FIG. 8D.

The pulse signal output from the output terminal 3b is supplied to the input terminal 5a of the gate signal generating time control circuit 5, and is then supplied to a terminal B of the timer 52b through the buffer 53b. When the "1" signal is supplied to a terminal CD of the timer 52b, the timer 52b generates a "1" signal from a terminal $\overline{Q}$ and a "0" signal from a terminal Q in response to the trailing edge of the signal supplied to the terminal B. This state is continued for only a time determined by the resistor 50b and the capacitor 51b. When the terminal CD goes to "0" level, the logic levels of the terminals Q and $\overline{Q}$ are inverted. Therefore, each time the pulse signal shown in FIG. 8D from the zero level detector 3 is supplied to the input terminal 5a, a pulse signal which is at "1" level during only a period T, as shown in FIG. 8E is generated. The period T is determined by the resistor 50b and the capacitor 51b, as described above, and the output signal from the timer 52b shown in FIG. 8A which is selected to be longer than a half-period of the AC current and to be shorter than one period thereof is supplied to the input terminal 6d of the gate signal generator 6 through the buffer 53c, the AND gate 58, and the output terminal 5g (the AND condition of the AND gate 58 is established, as will be described later). For this reason, as shown in FIG. 6, the oscillttor consisting of the NAND gate 60b and the inverter 63b repetitively generates a gate signal (FIG. 8F) having a short pulse width determined by the resistor 61d and the capacitor 62b during a period while the "1" signal is supplied to the input terminal 6d.

Upon power-on, the 3-minutes timer 41 of the heater turn on time control circuit 4 sends out a "0" signal, and this level is gradually increased within about 3 minutes. The differential amplifiers 44g and 44r send out "1" signals upon power-on, and these signals are output through the terminals 4f and 4g. These signals are supplied to one terminal of each of the AND gates 65a and 65c through the terminals 6e and 6f and the buffers 64a and 64b of the gate signal generator 6 shown in FIG. 6. The other terminal of each of the AND gates 65a and 65b receives the output from the zero level detector 3 through the inverter 56b of the gate signal generating time control circuit 5. As shown in FIG. 8D, the zero level detector 3 is set at "0" level for a short period of time after the zero level is detected, and is set at "1" level during other time periods. For this reason, the other input terminal of each of the AND gates 65a and 65c of the gate signal generator 6 shown in FIG. 6 receives a signal shown in FIG. 8D. During the "1" level period of the signal, the AND gates 65a and 65c send out the "1" signals. In response to this, the flip-flops 6a and 66b are set and generate "1" signals from their output terminals Q. The "1" signal causes the AND gate 65e to send out the "1" signal. Therefore, an oscillation waveform of a high frequency sent out from the inverter 63b is supplied to the transistor 68a through the AND gate 65i, the diode 67b, and the resistor 61f, thereby turning on the transistor. Then, the gate signal is supplied to the thyristors 70a and 70b of the thyristor circuit 7 through the pulse transformer 69a, thereby turning on these thyristors. The outputs from the thyristors 70a and 70b are supplied to the transformer 17, as shown in FIG. 5. Thus, the signals supplied to the transformer 17 are transformed, and then are supplied to the heater 22.

Since each pair of thyristors are connected in parallel with each other in the reverse-biased manner, one thyristor is turned by a positive half-wave of the AC waveform. In a thyristor, in general, when a forward bias voltage is applied to the anode, the thyristor can be turned on if a gate signal is supplied to the gate for a short period of time. However, it may not be turned on in accordance with environmental conditions. If the thyristor is always used under good environmental conditions, such an erroneous operation cannot occur. However, good environmental conditions may impair economy. Even if the erroneous operation state occurs, when the gate signal is supplied not once but repetitively, the thyristor can be reliably turned on. For this reason, in the apparatus of the presnt invention, a gate signal having a frequency of about 20 kHz is generated, and is supplied to the thyristors to allow them a reliable operation.

The ON thyristors are turned off by inverting the polarity of a power supply voltage applied across the anode and the cathode. Thus, as shown in FIG. 5, each pair of thyristors are connected in parallel with each other in the reverse-biased manner. Even when the AC waveform corresponds to a negative half-wave, the high-frequency gate signal can be kept supplied. In this manner, the thyristors which are actuated in response to a positive half-wave of a cycle of an AC waveform can also be actuated in response to a negative halfway cycle of a AC waveform. When the gate signal can be set to be turned off at a timing exceeding a half-period of the input AC waveform and within one period, the thyristors which have been turned on upon completion of one period of the input AC waveform can be turned off.

In this apparatus, as shown in FIG. 8G, the thyristors are turned on from the negative half-wave. After a time t1 at which the negative half-wave is changed to the positive half-wave, the gate signal can be supplied. Therefore, when the AC waveform corresponds to the positive half-wave, the thyristors which have been turned off in response to the negative half-wave can be turned on, and a positive half-wave is output. At time t2, supply of the gate signal is stopped. In this state, the thyristors which are in the ON state until time t3 at which the polarity of the power supply voltage corresponds to a positive half-wave are kept on. At time t3, since the power supply voltage corresponds to the negative half-wave, the thyristors which have been in the ON state by the positive half-wave are turned off. From this time, since supply of the gate signal is restarted, as shown in FIG. 8F, the thyristors which have been in the OFF state by the positive half-wave are turned on, and the output of the negative half-wave following the positive half-wave is output from the thyristor circuit 7, as shown in FIG. 8G. In this manner, each time the AC waveform crosses the zero level in one direction, i.e., from the positive direction toward the negative direction, the gate signal can be generated, so that the AC waveform can be continuously output.

At time t4, supply of the gate signal is stopped. As described above, the thyristors which have been in the ON state at this time are kept on. However, since the polarity of the AC waveform is altered at time t5, the thyristors which have been in the ON state are turned off. As shown in FIG. 8F, since no trigger signal is supplied after time t4, the thyristor circuit 7 generates no output signal after the time t4.

In this manner, when the thyristors are turned on from the beginning of the AC waveform and the trigger signal is disabled at a turn on end time before the waveform end timing in a polarity opposite to that of the above thyristor ON state, the thyristors are turned on/off at zero level of the AC waveform at the turn on start time and the turn on end time, and noise caused by the ON/OFF operation can be prevented. Since a signal is repetitively supplied to the gates of the thyristors, the thyristors can be reliably turned on.

The heater current turn on time control circuit 4 is arranged as shown in FIG. 3. The output voltage from the 3-minutes timer 41 is linearly increased from power-on and is saturated within about 3 minutes, as shown in FIG. 9A. The oscillator 43 generates a triangular wave at a frequency of about 8 Hz, as shown in FIG. 9B. For this reason, the differential amplifiers 42q outputs a "0" signal during an interval during which the output signal level from the 3-minutes timer 41 is higher than the triangular wave level. The signal from the amplifier 42q is sent out from the output terminal 4e, and is supplied to the terminal CD of the timer 52b through the terminal 5b, the inverter 56a, and the OR gate 54 of the gate signal generating time control circuit 5. Thus, a signal shown in FIG. 9F is supplied to the terminal CD of the timer 52b. Since the frequency of the AC power supply is about 400 Hz, the period of the triangular wave is 50 times that of the AC power supply. Therefore, one period of the triangular wave corresponds to 50 cycles of the waveform of the AC power supply. While the signal shown in FIG. 9D is at "1" level, since the gate signal is supplied to the thyristor circuit 7, the thyristor circuit 7 is intermittently turned on for three minutes after power-on, and the ON time is prolonged as a time elapses. After the output voltage of the timer shown in FIG. 9A is saturated, the thyristor circuit 7 is kept on. For this reason, as shown in FIG. 9E, the AC waveform output from the thyristor circuit 7 increases the number of repetitive waveforms during the output interval with the lapse of time.

In the above description, the temperature of glass is not considered. In practice, the thermistor mounted on the windshield provides a resistance corresponding to the temperature of glass. In general, the temperature is low, and a resistance is also low upon power-on. For this reason, in the differential amplifier 40q of the amplifier 40, since the voltage at the noninverting input terminal is larger than that at the inverting input terminal, this circuit generates a "1" signal, i.e., a signal for increasing a temperature of the heater 22. However, as has been described above, since the output voltage of the 3-minutes timer 41 is gradually increased, the output level of the differential amplifier 41q is lower than the output level of the differential amplifier 40q, and the output level of the differential amplifier 40q is clamped at the output level of the differential amplifier 41q through the diode 41t. Then, the signal of the clamped level is supplied to the inverting input terminal of the differential amplifier 42q. When the heater is heated, and the glass temperature is increased, the resistance of the thermistor is increased, and the voltage supplied to the inverting input terminal of the differential amplifier 40q is also increased. The output level of the differential amplifier 40q is gradually decreased. When the output level of the differential amplifier 40q is decreased to be lowr than the output level of the differential amplifier 41q, since the diode 41t is reverse-biased, a signal supplied to the inverting input terminal of the differential amplifier 42q is controlled by only the output signal from the differential amplifier 40q, and control is made to cause the glass temperature to be a balanced temperature.

The AC waveform output from the thyristor circuit 7 is supplied to the transformer 17, and is converted to a voltage required from the ratings of the heater 22 and the voltage is supplied to the heater 22. When intermittent turn on time control is performed using the transformer, if an intermittent time is shorter than a given value, the next turn on operation is started before the electromagnetic energy in the transformer is extinguished. When the turn on operation is restarted, a current of a polarity opposite to the immediately preceding polarity must be supplied. Otherwise, the magnetic flux in an iron core is saturated, and a large current is undesirably generated. For this reason, the AC waveform shown in FIG. 10A is generated. When this AC waveform is intermittently controlled, the turn on operation which is ended at the positive half-wave, as shown in FIG. 10A, must be restarted from the negative half-wave. As shown in FIG. 10C, the apparatus for realizing this generates the gate signal at a timing at which the waveform shown in FIG. 10A is changed in the negative direction, and the gate signal is stopped before the AC waveform is changed from the negative half-wave to the positive half-wave and that half-wave is ended. The stop timing of the gate signal is selected so that the thyristors can be reliably turned off when the positive half-wave is changed to the negative half-wave.

With the above arrangement, turn on time control is performed in units of periods of the AC waveform, and the turn on time is gradually prolonged from a power-on time, as shown in FIG. 9E. The turn on operation is started from when the AC waveform crosses the zero level in a given polarity direction, as shown in FIG. 10B, and is stopped when the AC waveform crosses the zero level in the same polarity direction as that at the turn on operation start time. This control is continued until the glass temperature reaches a predetermined temperature. After the glass temperature has reached the predetermined temperature, if the glass temperature changes due to a change in an atmospheric temperature, control for returning the glass temperature to be the predetermined temperature is performed.

In the above description, one type of power is supplied to the heater 22. As described above, ON/OFF control of power necessary for the heater 22 does not pose any problem in terms of temperature control of the heater 22. However, the power supply of the airplane does not have good voltage stability. Therefore, when the heater is turned on, a voltage in the airplane is decreased, and causes flickering of fluorescent lamps used for illumination, resulting in passenger discomfort. In this invention, turn on time control is first performed with low power. When all the periods of the AC current supplying the heater corresponds with the turn-on state as shown in FIG. 10B, the turn-on power and a power greater than the former are alternatively supplied to the heater. At this time, the turn on time of the larger power is relatively short, and is gradually prolonged as time lapses. In contrast to this, the turn on time of the smaller power is shortened as time lapses.

With the above arrangement, a decrease in voltage in the airplane can be limited within the allowance, and no flickering of the fluorescent lamps occurs.

A circuit capable of realizing the above-mentioned control will be described hereinafter. As described above, the outputs Q of the timers 52a and 52b shown in FIG. 4 are switched from "0" level to "1" level in response to the trailing edge of the signal supplied to the terminal B when the terminal CD is at "1" level. When the "0" signal is supplied to the terminal CD, these timers are reset, and the terminals Q are set at "0" level. For this reason, when the "1" signal is generated from the terminal Q of the timer 52b, the terminal Q of the timer 52a generates the "0" signal. The timer 52b sends out a "1" signal from its terminal Q while the signal shown in FIG. 9E is kept generated. On the other hand, the timer 52a generates a "1" signal from its terminal Q while the signal shown in FIG. 9E is not generated.

The output from the timer 52a of the gate signal generating time control circuit 5 is supplied from the output terminal 5f to the NAND gate 60a of the gate signal generator 6. The output from the timer 52b in the gate signal generating time control circuit 5 is supplied to the NAND gate 60b of the gate signal generator 6 through the flip-flop 57, the AND gate 58, and the output terminal 5g. Referring to FIG. 6, circuits which are denoted by reference numerals 600 and 601 and respectively include the AND gates 60a and 60b constitute an oscillation circuit (oscillation frequency: about 20 kHz). These oscillation circuits 600 and 601 are oscillated while the "1" signal is supplied to their NAND gates 60a and 60b. As described above, since the outputs from the timers 52a and 52b alternately appear, the oscillation circuits 600 and 601 also alternately generate outputs. These oscillation outputs are supplied to one input terminal of each of the AND gates 65h and 65l, respectively. The other input terminal of each of the AND gates 65h and 65l receives the output from the flip-flop 66a or 66b through the AND gate 65f or 65g. The flip-flop 66a is controlled by a signal supplied from the output terminal 4f of the heater current turn on time control circuit 4 through the buffer 64a and the AND gate 65a, and the flip-flop 66b is controlled by a signal supplied from the output terminal 4g of the control circuit 4 through the buffer 64b and the AND gate 65c. In the heater current turn on time control circuit 4, both the differential amplifiers 44g and 44r output "1" signals while the output level of the differential amplifier 40q shown in FIG. 3 is low. When the output level of the differential amplifier 40q has reached a predetermined level, the differential amplifier 44g begins to generate a "0" signal. When the output level from the differential amplifier 40q is further highered, both the differential amplifiers 44g and 44r output "0" signals. The output from the differential amplifier 40q changes depending on its input, i.e., the resistance of the thermistor 24 connected to the terminal 4a. The resistance of the thermistor 24 changes depending on the temperature of the windshield of the cockpit in which the heater 22 shown in FIG. 1 is embedded. The temperature of the windshield changes in accordance with a current supplied through the heater 22. Therefore, the circuit constant of the heater current on-time control circuit 4 is determined so that when the heater temperature exceeds a first temperature, the differential amplifier 44g outputs a "0" signal, and when the heater temperature exceeds a second temperature higher than the first temperature, the differential amplifier 44r also generates a "0" signal.

When the power supply is turned on, both the differential amplifiers 44g and 44r shown in FIG. 3 generate "1" signals upon operation of the 3-minutes timer 41, and the corresponding "1" signal is supplied to one input terminal of each of the AND gates 65a and 65c of the gate signal generator 6 shown in FIG. 6. The other input terminal of each of the AND gates 65a and 65c is connected to the output terminal 3b of the zero level detector 3 through input terminal 6b and the inverter 56b of the gate signal generating time control circuit 5. Therefore, when the pulse signal is supplied from the zero level detector 3, the AND gates 65a and 65c of the gate signal generator 6 output "1" signals, both the flip-flops 66a and 66b are set, and their Q outputs are set at "1" level.

The Q outputs from the flip-flops 66a and 66b of the gate signal generator 6 are supplied to the diodes 43u and 43t through the input terminals 4c and 4b of the heater current turn on time control circuit 4. In response to the supplied signals, a certain voltage is generated in the resistor 43i. Since this voltage is supplied to the inverting input terminal of the differential amplifier 43r, the differential amplifier 43r shifts the level of the triangular wave supplies to its noninverting input terminal, and outputs a triangular wave indicated by symbol a in FIG. 11. Note that characteristic curve d in FIG. 11 corresponds to the output from the 3-minutes timer 41.

Upon change in level of the 3-minutes timer 41, a time duration of a 20-kHz signal output from the inverter 63b of the gate signal generator 6 is gradually prolonged (FIG. 9E). Since the "1" signal is generated from the AND gate 65e of the gate signal generator 6, the 20-kHz signal generated from the inverter 63b of the oscillation circuit 601 is supplied to the transistor 68a through the AND gate 65i, the diode 67b, and the resistor 61f, thereby turning on/off at a frequency of about 20 kHz. Therefore, the gate signal is supplied to the thyristors 70a and 70b of the thyristor circuit 7 to turn them on. As a result, a heater current is supplied to the heater 22 through the transformer 17. The duration time of the output from the inverter 63b is gradually prolonged intermittently as time lapses, as shown in FIG. 9E. At this time, since the ON thyristors 70a and 70b are connected to taps having the maximum numbers of primary windings of the transformer 17, the heater current becomes 7 A in correspondence with this, and is generated as shown in FIG. 12A.

A duration in which the heater current of 7 A is kept generated is gradually prolonged as described above, and then the continuous turn on state is established. The glass temperature then reaches a first temperature. As a result, the output level of the differential amplifier 40q shown in FIG. 3 has been increased up to a value corresponding to that temperature, and this is detected by the differential amplifier 44a. Then, the amplifier 44g switches its output from the "1" signal to the "0" signal. This signal is supplied to the reset terminal R of the flip-flop 66a of the gate signal generator 6, thereby resetting it. For this reason, the AND condition of the AND gate 65e which sends the "1" signal can no longer be established. Instead, the AND condition of the AND gate 65f is established. The "1" signal is generated from the AND gate 65f, and is supplied to the AND gates 65j and 65h.

When the output level of the flip-flop 66a is changed from "1" level to "0" level, the level of the triangular wave is shifted as indicated by symbol b in FIG. 11. For this reason, the output waveform of the inverter 63b of the gate signal generator 6 corresponds to an intermittent signal as shown in FIG. 9D. As described above, the timers 52a and 52b of the gate signal generating time control circuit 5 are arranged so that while one produces an output, the other one does not produce an output. Therefore, as shown in FIG. 9F, the inverter 63a of the gate signal generator 6 sends out a signal at a frequency of about 20 kHz while supply of the signal shown in FIG. 9E is stopped, and the duration of the signal in FIG. 9F is gradually shortened with the lapse of time in contrast to that shown in FIG. 9E. For this reason, 20-kHz signals are alternately output from the AND gates 65h and 65j, and the pair of thyristors 70a and 70b and the pair of thyristors 70c and 70d are alternately turned on. The pair of thyristors 70c and 70d are connected to taps having smaller numbers of primary windings of the transformer 17. Therefore, when these thyristors are turned on, a larger current can be supplied to the heater 22, and more specifically, a current of 14 A can be supplied to the heater 22. At this time, the duration of the signal sent out from the AND gate 65j is prolonged as time lapses, while the duration of the signal sent out from the AND gate 65h is shortened as time lapses. Therefore, the current flowing through the heater 22 is as shown in FIG. 12B. Referring to FIG. 12B, portions having a smaller amplitude correspond to the current of 7 A and portions larger amplitude correspond to the curent of 14 A.

When the heater current is increased in this manner, the glass temperature then reaches a predetermined temperature. The flip-flop 66b of the gate signal generator 6 is then reset. For this reason, the AND condition of the AND gate 65f cannot be established, and that of the AND gate 65g is established instead. Then, the 20-kHz signals are alternately sent out from the AND gates 65k and 65l, and the pair of thyristors 70c and 70d and the pair of thyristors 70e and 70f are alternately turned on. Since these thyristors alternately supply a current of 14 A and a current of 20 A to the heater 22 through the transformer 17, the current supplied through the heater 22 is as shown in FIG. 12C. In FIG. 12C, portions having a larger amplitude correspond to the current of 20 A, and portions having a smaller amplitude correspond to the current of 14 A.

In this manner, if phase control in units of wavelengths is performed, a current can be changed stepwise so that voltage fluctuation can be eliminated, and flickering of fluorescent lamps in the airplane can be prevented.

However, the amplitudes of the currents must be switched by switching the two circuits and their phases must be continued. Upon switching, phase mismatching easily occurs, and at that time, a large current is generated and a voltage fluctuation factor is undesirably increased. In order to prevent this mismatching, the flip-flop 57, the resistors 50d and 50e, the capacitor 51d, the diodes 55a and 55b, and the AND gate 58 are arranged in the gate signal generating time control circuit 5, so that the gate signal is slightly delayed in only the first period of the AC waveform upon switching of the current values. More specifically, when the flip-flop 57 is set, its output is output to be delayed by a time constant determined by the resistor 50d and the capacitor 51d, and the AND gate 58 is enabled to be delayed by the delay time. The timer 52c is adopted to slightly prolong the duration of the waveform before switching at the waveform switching point. An over-current caused by phase mismatching can thus be prevented. No delay time is required after the first one period, and the delay time after the second period and thereafter can be prevented by the diode 55b.

Since a power sent out from a power supply circuit selected in this manner is delayed by a predetermined time from a switching time, phase mismatching upon switching cannot occur, and saturation current is therefore prevented. Therefore, the voltage fluctuation factor can be reduced.

The AC waveform output from the thyristor circuit 7 is converted by the transformer 17 into a voltage required from the ratings of the heater 22. In this case, part of the windings of the transformer 17 is constituted by the transformer 91 of the heater current detector 9. For this reason, the current supplied to the heater 22 is picked up by the transformer 91, and is rectified by the diode 92. The rectified current is input to the inverting input terminal of the differential amplifier 93. The differential amplifier 93 receives at its noninverting input terminal a reference voltage 94 slightly higher than the voltage supplied to the inverting input terminal due to a maximum rating value of the heater current. Therefore, if a heater current is higher than the maximum rating value is generated, the differential amplifier 93 outputs a "0" output signal. The output terminal 5e of the gate signal generating time control circuit 5 outputs a "1" signal during most of an interval in which a heater current is supplied thereto. When this signal and the "0" level signal output from the heater current detector 9 are supplied to the AND gate 15, the thyristors are turned on, and an operation indication lamp 23 for indicating that a heater current is supplied to the heater 22 is turned on.

A current output from the thyristor circuit 7 is supplied to the input terminal 8a of the over-current detector 8. The current is supplied through the resistor 81a shown in FIG. 7, and causes it to generate an AC voltage having an amplitude corresponding to the current value supplied through the thyristors. The AC voltage is supplied to the inverting input terminal of the differential amplifier 84 shown in FIG. 7. If the noninverting input terminal of the differential amplifier 84 receives a V/2 bias voltage, a signal shown in FIG. 13B appears as the output from the amplifier 84. However, in this state, a circuit for rectifying an input waveform must be arranged. When the ratings of the differential amplifier 84 are examined in detail, an IC in which an operation for an input voltage of $-0.3$ V or higher is assured (e.g., LM2904) is used. The noninverting input terminal of this IC is grounded (see FIG. 7), and a signal having an amplitude of about $-0.6$ V is supplied to the inverting input terminal, so that a positive half-wave having an amplitude V can be output. More specifically, rectification and amplification can be performed by the differential amplifier 84 at the same time.

The output from the differential amplifier 84 is smoothed by the resistor 81c and the capacitor 82b. When the smoothed output becomes higher than a reference potential determined by the resistors 81f and 81e, the differential amplifier 85 generates a "1" output signal. The "1" signal is output through the output terminals 8b and 8c and is supplied to the input terminal 6g of the gate signal generator 6 and the input terminal 10f of the sensor short-circuit detector 10. For this reason, in the gate signal generator 6, the transistor 68d shown in FIG. 6 is turned on, and the bases of the transistors 68a to 68c are set to be a ground potential. Therefore, no gate signal is supplied to the thyristors, and all the thyristors are turned off. In the sensor short-circuit detector 10, the relay 16 is deenergized by a signal supplied to the input terminal 10f, and the contact 16a is opened.

If the windshield is subjected to an over-heat state for any cause, the resistance of the thermistor 24 is increased. Since the thermistor receives a current from the heater current turn on time control circuit 4, if the windshield is subjected to the over-heat state, a voltage supplied to the noninverting input terminal of the differential amplifier 11a in the over-heat detector 11 is increased. When this voltage exceeds the voltage of the reference voltage source 11b, the differential amplifier 11a generates a "1" output signal, and this signal is inverted by the inverter 11c. Since the inverted signal is supplied to the inverter 10d of the sensor short-circuit detector 10, the relay 16 is deenergized at this time.

When the thermistor 24 is short-circuited for any reason, a voltage applied to the inverting input terminal of the differential amplifier 10a of the sensor short-circuit detector 10 becomes lower than that applied to its noninverting input terminal. Thus, the differential amplifier 10a generates a "1" signal. The relay 16 is then deenergized, and supplies no power to the thyristor circuit 7.

The windshield is over-heated due to the over-current and when it is exposed to high-temperature external air. In this case, the over-current detector also detects the over-heat state of the windshield. For this reason, in this invention, the heater current is detected. If the heater current is a normal value, the over-current detector is rendered inoperative. More specifically, the heater current detector 9 shown in FIG. 1 sends out a "1" signal when the heater current is in a normal state. Thus, the "1" signal is supplied to the inverting input terminal of the differential amplifier 11a of the over-heat detector 11. The noninverting input terminal of the differential amplifier 11a receives a current generated in the thermistor 24. However, the voltage appearing at the noninverting input terminal changes in correspondence to the temperature of the windshield, and is lower than a power supply voltage. However, since the voltage at the inverting input terminal is at "1" level, the voltage at the noninverting input terminal can be considered to be substantially equivalent to the power supply voltage. When the heater current is below the normal value, the voltage at the inverting input terminal of the differential amplifier 11a always becomes higher than that at the noninverting input terminal, and the output from the differential amplifier 11a is at "0" level. Therefore, the inverter 11c outputs a "1" signal, and does not influence the operation of the sensor short-circuit detector 10, i.e., the operation of the relay 16.

If an over-current is supplied to the heater 22, since the heater current detector 9 outputs a "0" signal, this output signal does not influence the over-heat detector 11. For this reason, the over-heat detector 11 detects a voltage generated at the thermistor 24. If this voltage exceeds n allowance, the sensor short-circuit detector 10 is driven and hence, the relay 16 is deenergized. Therefore, no current is supplied to the heater 22, and the over-heat state of the windshield can be prevented. In this case, since the AND condition of the AND gate 15 is established, the lamp 23 is turned on, and an abnormal state can be indicated.

The switch 20 generates a state wherein an output voltage from the timer 41 (3-minutes timer) is saturated upon power-on. Therefore, the state of temperature control by the thermistor 24 can be simultaneously checked with power-on.

The switch 21 generates a pseudo over-heat state.

In the above embodiment, the heating circuit for the heater of the windshield of the cockpit has been exemplified. However, the present invention is not limited to this, but can be applied to any apparatus which performs AC power variable control.

What is claimed is:

1. An AC power control apparatus comprising:
   a plurality of power supply means for generating powers having different maximum values;
   switching means for; after an AC current is continuously set in a desired turn on control state, alternately selecting first power supply means and second power supply means for supplying a power approximating a substantially uniform power supplied to a load from said plurlaity of power supply means;
   turn on tme control means for gradually shortening a turn on time of said first power supply means while gradually prolonging a turn on time of said second power supply means until the turn on time of said second power supply means corresponds to the entire period; and
   means for changing the turn on time of said power supply means in units of periods of the AC current.

2. An apparatus according to claim 1, wherein said switching means comprises delay means for outputting the power output from the selected power supply means to be delayed from a switching time by a predetermined period of time.

3. An apparatus according to claim 1, wherein said turn on time control means comprises trigger means for generating a trigger signal which starts from the beginning of an AC waveform generated in a polarity direction and terminates sufficiently before the end of the AC waveform in a polarity opposite to the polarity direction during a turn on period of the AC current.

4. An apparatus according to claim 1, wherein said turn on time control means comprises trigger means for repetitively supplying a signal to a gate of said power supply means to be turned on.

* * * * *